United States Patent
Shirota

(10) Patent No.: US 8,139,180 B2
(45) Date of Patent: Mar. 20, 2012

(54) ILLUMINATING DEVICE, AND LIQUID CRYSTAL DISPLAY DEVICE AND PORTABLE TERMINAL DEVICE INCLUDING THE ILLUMINATING DEVICE

(75) Inventor: Hideyuki Shirota, Saitama (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 12/375,346

(22) PCT Filed: Jul. 25, 2007

(86) PCT No.: PCT/JP2007/064595
§ 371 (c)(1),
(2), (4) Date: Jan. 27, 2009

(87) PCT Pub. No.: WO2008/013204
PCT Pub. Date: Jan. 31, 2008

(65) Prior Publication Data
US 2009/0244431 A1  Oct. 1, 2009

(30) Foreign Application Priority Data
Jul. 28, 2006 (JP) .................... 2006-205920

(51) Int. Cl.
*G02F 1/1335* (2006.01)
(52) U.S. Cl. .......................... 349/65; 362/615
(58) Field of Classification Search .............. None
See application file for complete search history.

(56) References Cited

U.S. PATENT DOCUMENTS

| 7,750,990 B2 * | 7/2010 | Jeong ............ 349/58 |
| 7,798,700 B2 * | 9/2010 | Sun ............... 362/628 |
| 2009/0268122 A1 * | 10/2009 | Takahashi ........ 349/58 |

FOREIGN PATENT DOCUMENTS

| JP | 1993019254 A | 1/1993 |
| JP | 1997243828 A | 9/1997 |
| JP | 2002093233 A | 3/2002 |
| JP | 2003195265 A | 7/2003 |
| WO | 2004055430 A1 | 7/2004 |

OTHER PUBLICATIONS

International Search Report for PCT/JP2007/064595 mailed Oct. 16, 2007.

* cited by examiner

*Primary Examiner* — Thanh-Nhan Nguyen

(57) ABSTRACT

On the side surface of an optical guide plate (104), an engaging protrusion (105) is formed for fixing the optical guide plate (104) on to a frame (101) by fitting the optical guide plate in a recessed portion formed on the frame. The light emitted from an LED (107) enters the optical guide plate (104) from a light-incident end surface and travels in the optical guide plate (104) while spreading in a fan-shape. The engaging protrusion (105) is formed outside the outgoing-angle range of the beam (109) spreading in the fan-shape, thereby preventing occurrence of bright line caused by reflection of light at the corner portion of the base of the engaging protrusion (105).

5 Claims, 3 Drawing Sheets

ILLUMINATING DEVICE, AND LIQUID CRYSTAL DISPLAY DEVICE AND PORTABLE TERMINAL DEVICE INCLUDING THE ILLUMINATING DEVICE

TECHNICAL FIELD

The present invention relates to an illuminating device, a liquid crystal display device and a portable terminal device and, more particularly, to an illuminating device that receives light from a light source through an edge portion thereof and emits the received light through a planar luminescence section, and a liquid crystal display device and a portable terminal device including such an illuminating device.

BACKGROUND ART

Portable terminal devices, such as a mobile phone and a PHS, including a liquid crystal display are now widely used. Such a portable terminal device generally includes an illuminating device so as to allow a user to observe the liquid crystal display even under a dark environment. As the illuminating device used in the portable terminal device, there is a known one of an optical-guide-plate type that receives light emitted from an LED inside the optical guide plate and emits the received light from the front surface side of the optical guide plate. Along with a reduction in the size and thickness of the portable terminal device, a technique of fixing the optical guide plate onto a frame in a reduced space is now required for the illuminating device incorporated in the portable terminal device.

As a method for fixing the optical guide plate onto the frame in the illuminating device of an optical guide plate type, there is a known one that forms a protrusion member (engaging protrusion) on the side surface of the optical guide plate and fits the engaging protrusion to a recessed portion formed in the frame. FIG. 6(a) is a top plan view of a liquid crystal display device including the illuminating device of this type, and FIG. 6(b) is a sectional view thereof. A frame 201 plays a role for fixing components of the liquid crystal display device. A liquid crystal display panel 202 includes a pair of glass substrates and a liquid crystal layer sandwiched therebetween. In the liquid crystal display panel 202, an electric field is applied to the liquid crystal layer so as to control the orientation of liquid crystal molecules and thereby control the amount of light transmitted therethrough, whereby an image is displayed.

The optical guide plate 204 receives therein light emitted from an LED 207 configuring a light source through a light-incident end surface. The received light is repeatedly reflected and transmitted at a luminescence section of the optical guide plate 204 to be converted into a surface-emission light. The optical guide plate 204 then emits the surface-emission light toward the liquid crystal display panel 202. Engaging protrusions 205 are formed on the side surfaces of the optical guide plate 204 that cross the light-incident end surface at right angles. The engaging protrusions 205 are each formed as a part of the optical guide plate 204 and each have a shape corresponding to the recessed portions formed in the frame 201. The engaging protrusions 205 are fitted in the recessed portions of the frame so as to fix the optical guide plate 204 onto the frame 201.

An optical sheet 203 collects the light emitted from the optical guide plate 204 on the liquid crystal display panel 202. A reflecting sheet 206 reflects the light leaking from the optical guide plate 204 toward the reflecting sheet 206 so as to return the leakage light toward the optical guide plate 204.

The light emitted from each LED 207 enters the optical guide plate 204 while spreading in a fan-shape as a light beam 209 shown in FIG. 6(a). An effective display area 208 defines the effective visible range of the display screen of the liquid crystal panel 202.

In the liquid crystal display device 200 shown in FIGS. 6(a) and 6(b), a bright line 210 occurs due to reflection of light at the corner portion of the base of the engaging protrusion 205 formed on the side surface of the optical guide plate 204. The bright line 210 enters the effective display area 208 to degrade the display quality of the liquid crystal display device 200. As a technique to solve the problem of the occurrence of the bright line due to existence of the engaging protrusion, there is a known technique described in WO2004/055430. FIG. 7 shows a liquid crystal display device including the illuminating device described in WO2004/055430. The liquid crystal display device 200a shown in FIG. 7 differs from the liquid crystal display device 200 of FIG. 6 in that the engaging protrusions 205 are formed over the entire area of the side surfaces of the optical guide plate 204. The technique of WO2004/055430 adopts the above configuration to prevent occurrence of the bright line at the corner portion of the base of the engaging protrusions 205.

The problems encountered in the conventional liquid crystal display device are considered in the present invention as follows. In the configuration of the liquid crystal display device of WO2004/055430, since the engaging protrusions 205 are formed over the entire area of the side surfaces of the optical guide plate 204, the longitudinal dimension of the engaging protrusion 205 is increased. Thus, the thickness of the frame 201 needs to be reduced over the entire longitudinal direction thereof at the fitting portion. Therefore, the mechanical strength of the frame 201, which is required to have an enough strength to support components of the liquid crystal display device, is decreased.

Patent Publication JP-1997-243828A also describes an illuminating device that includes positioning protrusions on the side surfaces of the optical guide plate. In the device, protrusions are formed on the light-incident side surfaces of the optical guide plate, and the shape of the protrusions is appropriately selected, whereby an uneven luminance caused due to existence of the protrusion is prevented. However, this publication assumes the use of a fluorescent lamp as a light source for irradiating the light-incident surface with light and does not assume the use of a light source emitting light that spreads in a fan-shape. Therefore, the spread of the light entering the optical guide plate through the light-incident surface, which is caused by the use of a light source emitting light that spreads in a fan-shape, is not considered. Thus, even by adopting the configuration described in JP-1997-243828A, the problem that bright line occurs at the protrusion when the protrusion exists within the outgoing-angle range of light spreading in a fan-shape cannot be solved.

SUMMARY OF THE INVENTION

The present invention has been devised to solve the above problem, and an object of the present invention is to provide an illuminating device, a liquid crystal display device, and a portable terminal device capable of fixing the optical guide plate onto the frame within a reduced space and suppressing the influence on the display quality of the display device by the protrusion formed for fixing the optical guide plate.

The present invention provides, in a first aspect thereof, an illuminating device including: a light source that emits light spreading in a fan-shape; and an optical guide plate including a light-incident end surface for receiving therein light emitted from the light source, a luminescence section for converting the received light into a surface-emission light for emission thereof, and a protrusion for fixing the optical guide plate onto a housing, characterized in that the protrusion is formed on the side surface of the optical guide plate that crosses at right angles the light-incident end surface of the optical guide plate at a position outside an outgoing-angle range of the light that travels through the light-incident end surface while spreading in a fan-shape.

The present invention provides, in a second aspect thereof, a liquid crystal display device including: a light source that emits light spreading in a fan-shape; an optical guide plate including a light-incident end surface for receiving therein light emitted from the light source, a luminescence section for converting the received light into a surface-emission light for emission thereof, and a protrusion for fixing the optical guide plate onto a housing; and a liquid crystal display panel using the light emitted from the luminescence section of the optical guide plate as a backlight source, characterized in that the protrusion is formed on a side surface of the optical guide plate that crosses at right angles the light-incident end surface of the optical guide plate at a position that does not overlap an effective display area of the liquid crystal display panel.

A portable terminal device according to the present invention includes the above liquid crystal display device of the present invention.

The above and other objects, features and advantages of the present invention will be more apparent from the following description referring to the accompanying drawings.

BEST MODE FOR CARRYING OUT THE INVENTION

Figure 1:
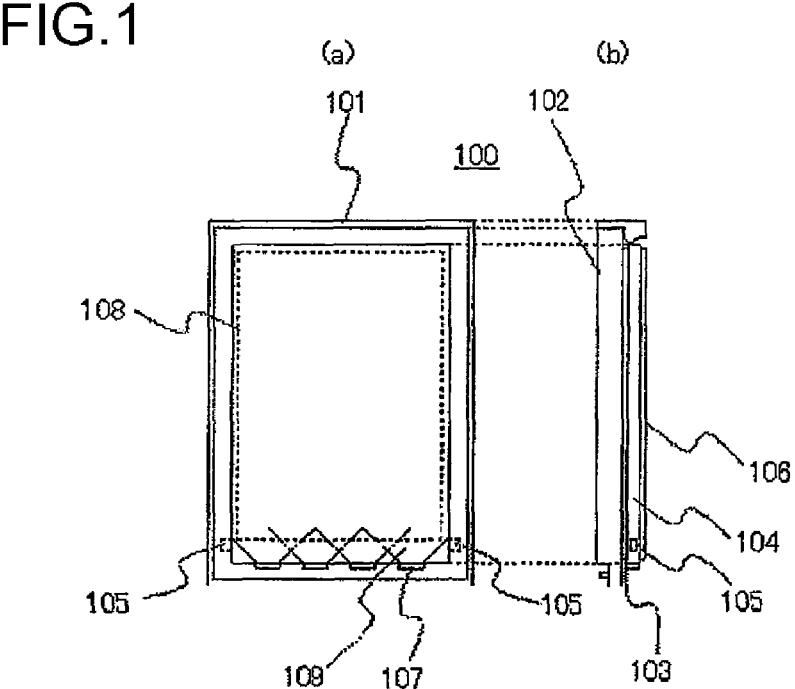
FIG. 1(a) is a front view of a liquid crystal display device according to a first exemplary embodiment of the present invention.
FIG. 1(b) is a sectional view of the vicinity of the central portion thereof as viewed in the lateral direction.

Exemplary embodiments of the present invention will be described in detail below with reference to the accompanying drawings. FIG. 1(a) is a front view of a liquid crystal display device including an illuminating device of a first exemplary embodiment of the present invention, and FIG. 1(b) is a sectional view of the vicinity of the central portion thereof. The liquid crystal display device 100 is mounted on, e.g. a compact-size portable terminal device. A liquid crystal display panel 102 includes a pair of glass substrates and a liquid crystal layer sandwiched therebetween. In the liquid crystal display panel 102, an electric field is applied to the liquid crystal layer so as to control the orientation of liquid crystal molecules and thereby control the amount of light transmitted therethrough, whereby an image is displayed. An optical guide plate 104 receives therein the light emitted from an LED 107 serving as a light source through a light-incident end surface. The received light is repeatedly reflected and transmitted at a luminescence section of the optical guide plate 104 to be converted into surface-emission light. The optical guide plate 104 then emits the surface-emission light toward the liquid crystal display panel 102.

A frame 101 plays a role of fixing components of the liquid crystal display device.

Engaging protrusions 105 are formed on the side surfaces of the optical guide plate 104 that cross the light-incident end surface at right angles. The engaging protrusions 105 are each formed as a part of the optical guide plate 104 and fitted in recessed portions formed in the frame 101 so as to fix the optical guide plate 104 onto the frame 101. An optical sheet 103 collects the light emitted from the optical guide plate 104 on the liquid crystal display panel 102. A reflecting sheet 106 reflects the light leaking from the optical guide plate 104 toward the reflecting sheet 106 so as to return the leakage light toward the optical guide plate 104. The light emitted from each LED 107 enters the optical guide plate 104 while spreading in a fan-shape as a light beam 109 shown in FIG. 1. An effective display area 108 defines the effective visible range of the display screen of the liquid crystal panel 102.

Figure 2:
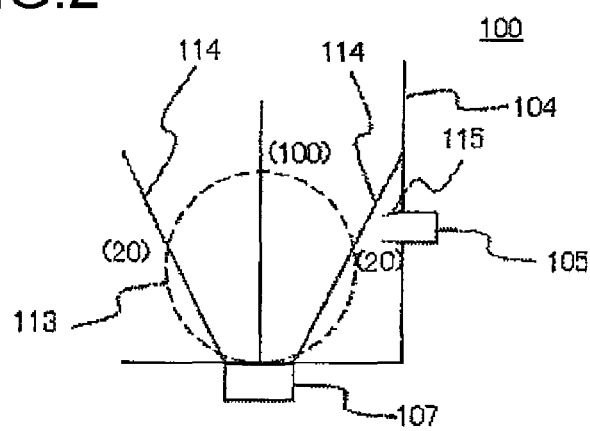
FIG. 2 is a top plan view showing in an enlarged view the vicinity of the engaging protrusion in the liquid crystal display device of FIG. 1.

FIG. 2 shows in an enlarged view the vicinity of the engaging protrusion 105 in the liquid crystal display device 100 of FIG. 1. The light emitted from the LED 107 enters the optical guide plate 104 while spreading in a fan-shape. The intensity of the incident light is maximum in the front direction of the LED 107 (direction perpendicular to the light incidence) and becomes small as the angle relative to the front direction increases. The light intensity distribution 113 shown in FIG. 2 represents that the light intensity (relative value) decreases as the angle relative to the front direction increases, with the light intensity in the front direction being expressed by 100.

In FIG. 2, straight lines 114 extending from the LED 107 denote lines on which the relative value of the light intensity is 20. That is, the relative value of the light intensity is 20 or more in the range sandwiched by the straight lines, i.e., at the inside of the two straight lines, and is less than 20 at the outside of the two straight lines. Here, the light in the range sandwiched by the straight lines 114 is referred to as a within-outgoing-angle-range light of the light that travels and spreads in a fan-shape from the LED 107, and the light in the range outside the straight lines 114 is referred to as a beyond-outgoing-angle-range light.

In the present exemplary embodiment, the engaging protrusion 105 is formed on the side surface of the optical guide plate 104 extending in the direction perpendicular to the light-incident surface of the optical guide plate 104 at a position nearer to the LED 107 than the intersection between the side surface and the straight line 114 on which the relative value of the intensity of the outgoing light is 20. That is, the engaging protrusion 105 are formed outside the outgoing-angle range of the light emitted from the LED 107. In this configuration, the amount of light reflected at the corner portion of the base of the engaging protrusion 105 is small, with the result that there occurs substantially no bright line 115 at the corner portion of the base of the engaging protrusion 105.

Figure 3:
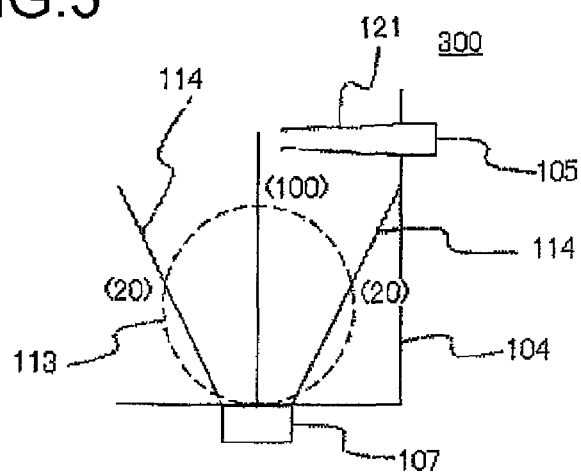
FIG. 3 is a top plan view showing in an enlarged view the vicinity of the engaging protrusion in a liquid crystal display device of a comparative example.

As a comparative example, a case is assumed where the engaging protrusion is formed at a farther position in the light that travels direction (at the position away from the LED 107) relative to the angle at which the relative value of the intensity of the light emitted from the LED 107 is 20. FIG. 3 shows in an enlarged view the vicinity of the engaging protrusion in the liquid crystal display device of the comparative example. As shown in FIG. 3, in the liquid crystal display device 300 of the comparative example, the light intensity at the corner portion of the base of the engaging protrusion 105 is large. Accordingly, the bright line 121 is longer and enters the effective display area 108 (FIG. 1) of the liquid crystal display panel 102.

In the present exemplary embodiment, the engaging protrusion 105 for fixing the optical guide plate 104 onto the frame 101 is formed on the side surface of the optical guide plate 104 extending in the direction perpendicular to the light-incident surface of the optical guide plate 104 outside the outgoing-angle range of the light that travels and spreads in a fan-shape from the LED 107. In this configuration, even though the engaging protrusion 105 is not formed over the entire area of the side surface of the optical guide plate 104 that crosses the light-incident surface thereof at right angles, occurrence of the bright line due to reflection of the light emitted from the LED 107 at the corner portion of the base of the engaging protrusion 105 for fixing the optical guide plate 104 can be prevented. Thus, the size of the engaging protrusion need not be increased, thereby contributing to a reduction of the size of the liquid crystal display device 100 without involving a reduction in the mechanical strength of the frame.

Figure 4:
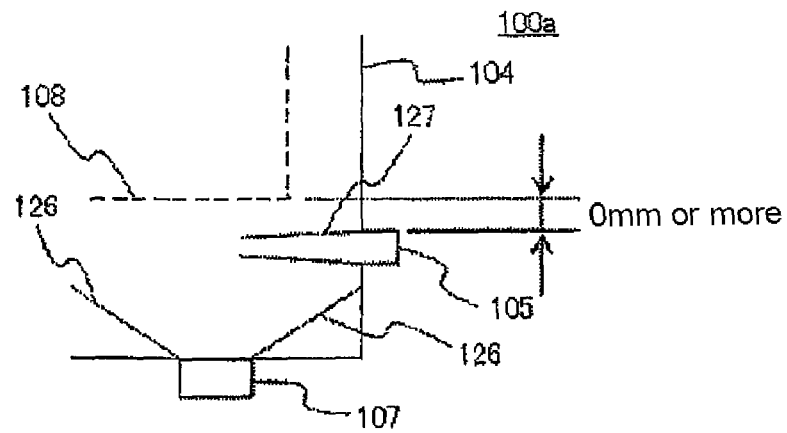
FIG. 4 is a top plan view showing in an enlarged view the vicinity of the engaging protrusion in a liquid crystal display device according to a second exemplary embodiment of the present invention.

FIG. 4 shows in an enlarged view the vicinity of the engaging protrusion in a liquid crystal display device including an illuminating device according to a second exemplary embodiment of the present invention. The liquid crystal display device 100a of the present embodiment differs from the liquid crystal display device 100 of the first exemplary embodiment in the position at which the engaging protrusion 105 of the optical guide plate 104 is formed. In the present exemplary embodiment, the engaging protrusion 105 is formed on the side surface of the optical guide plate 104 that crosses the light-incident surface of the optical guide plate 104 at right angles at a position that does not overlap the effective display area 108 of the liquid crystal display panel 102 (FIG. 1).

Straight lines 126 in FIG. 4 denote lines on which the relative value of the intensity of the light emitted from the LED 107 is 20 and, at the same time, represent the range of outgoing-angle of the light emitted from the LED 107. As in the case of the comparative example (FIG. 3) of the first exemplary embodiment, in the present exemplary embodiment, the engaging protrusion 105 is formed within the outgoing-angle range of the light emitted from the LED 107, and a bright line 127 occurs at the corner portion of the base of the engaging protrusion 105. However, the bright light 127 travels outside the effective display area 108 of the liquid crystal display panel 102, whereby there scarcely occurs a degradation in the display quality.

As a comparison example, a case is assumed where the engaging protrusion 105 is formed at a position that overlaps the effective display area 108 in the longitudinal direction (in the direction perpendicular to the light-incident surface) of the effective display area 108.

Figure 5:
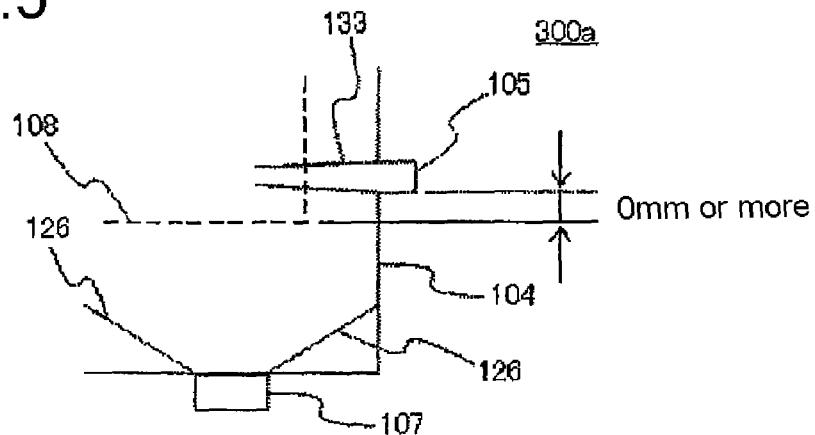
FIG. 5 is a top plan view showing in an enlarged view the vicinity of the engaging protrusion in a liquid crystal display device of a comparative example.
Figure 6:
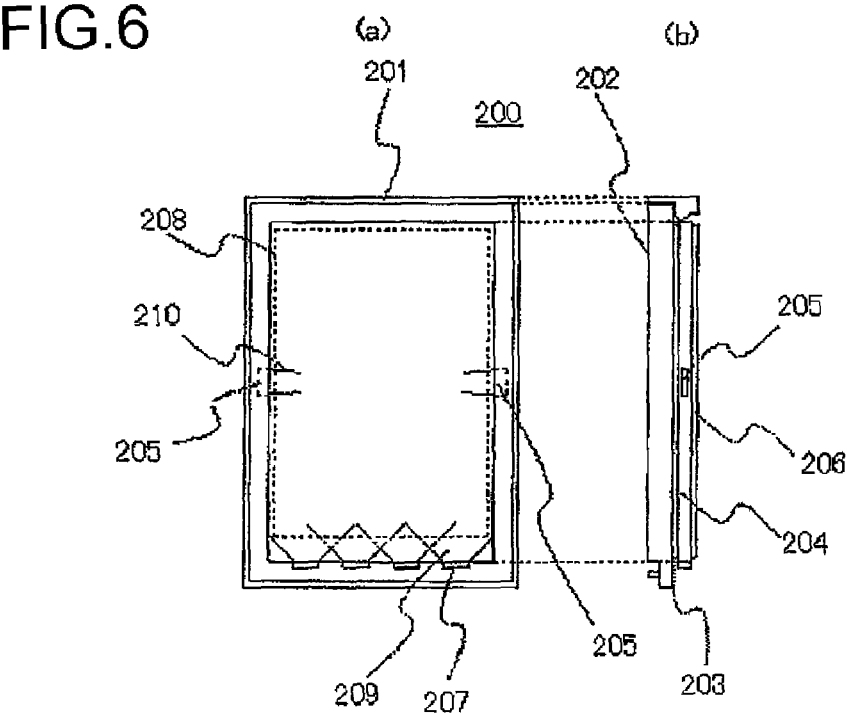
FIG. 6(a) is a top plan view showing the configuration of a conventional liquid crystal display device as viewed from the front.
FIG. 6(b) is a sectional view of the vicinity of the central portion thereof as viewed in the lateral direction.
Figure 7:
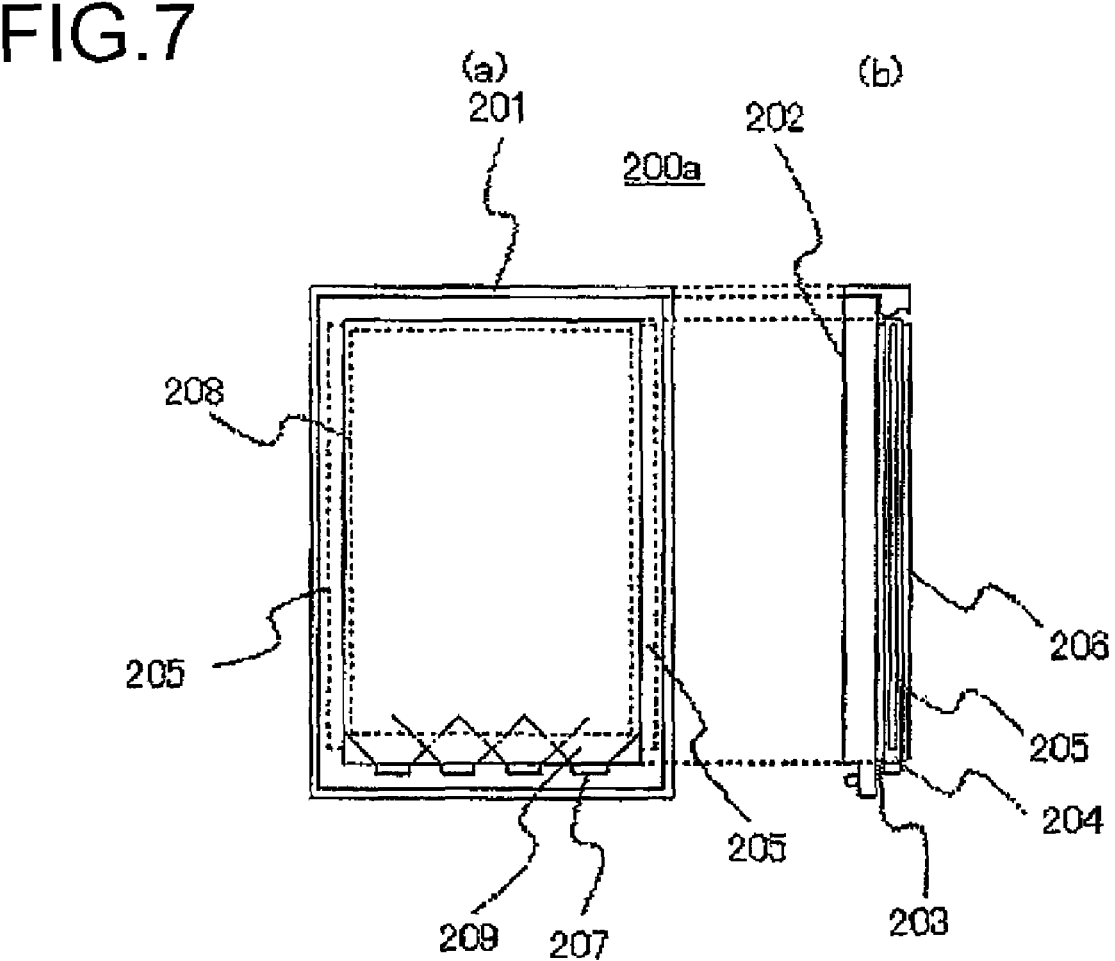
FIG. 7(a) is a top plan view showing the configuration of a liquid crystal display device described in Republished Patent Publication No. WO2004/055430 as viewed from the front.
FIG. 7(b) is a sectional view of the vicinity of the central portion thereof as viewed in the lateral direction.

FIG. 5 shows in an enlarged view the vicinity of the engaging protrusion in the liquid crystal display device of the comparative example. As shown in FIG. 5, in the liquid crystal display device 300a of the comparative example, a bright line 133 occurs at the corner portion of the base of the engaging protrusion 105, and the position at which the engaging protrusion 105 of the optical guide plate 104 on the side surface of the optical guide plate 104 overlaps the effective display area 108. Thus, the bright line 133 enters the effective display area 108 of the liquid crystal display panel 102 (FIG. 1), thereby degrading the display quality.

In the present exemplary embodiment, the engaging protrusion 105 for fixing the optical guide plate 104 onto the frame 101 is formed on the side surface of the optical guide plate 104 that crosses at right angles the light-incident surface of the optical guide plate 104 at a position that does not overlap the effective display area 108 of the liquid crystal display panel 102. In this configuration, even though the bright line occurs at the corner portion of the engaging protrusion 105, the bright line does not enter the effective display area, thereby preventing the display quality from being degraded. Further, in the present exemplary embodiment, the engaging protrusion 105 need not be formed over the entire area of the side surface of the optical guide plate 104 that crosses the light-incident surface thereof at right angles. Thus, the size of the engaging protrusion can be reduced, thereby contributing to a reduction of the size of the liquid crystal display device 100a without involving a reduction in the mechanical strength of the frame.

In the first exemplary embodiment, the protrusion is formed on the side surface of the optical guide plate that crosses at right angles the light-incident end surface of the optical guide plate at a position outside the outgoing-angle range of the light emitted from the light source. Outside the outgoing-angle range of the light refers to the angle range within which the relative intensity of the light is lower than a predetermined value, e.g., 20% of the light intensity which is obtained in the direction of the maximum light intensity. By forming the protrusion for fixing the optical guide plate onto the frame outside the outgoing-angle range of the light emitted from the light source, occurrence of the bright line at the corner portion of the base of the protrusion can be prevented to thereby make the luminance in the luminescence section uniform.

In the second exemplary embodiment, the protrusion for fixing the optical guide plate is formed on the side surface of the optical guide plate that crosses at right angles the light-incident end surface of the optical guide plate at a position that does not overlap the effective display area of the liquid crystal display panel. Thus, even though the bright line occurs at the corner portion of the protrusion and enters from the side surface of the optical guide plate toward the inside thereof, the bright line does not enter the effective display area.

Therefore, the luminance in the luminescence section of the optical guide plate within the effective display area of the liquid crystal display panel can be made uniform, thereby preventing the display quality of the liquid crystal display device from being degraded.

By employing the configuration in which the protrusion formed on the side surface of the optical guide plate is located outside the outgoing-angle range of the light emitted from the light source, occurrence of the bright line due to existence of the protrusion can be prevented, thereby preventing degradation of the display quality caused by existence of the protrusion. By employing the configuration in which the protrusion formed on the side surface of the optical guide plate is located at a position that does not overlap the effective display area of the liquid crystal display panel, entering of the bright line that occurs due to the existence of the protrusion into the effective display area can be prevented, thereby preventing degradation of the display quality caused by existence of the protrusion.

The present invention provides a liquid crystal display device including the illuminating device according to the above embodiments and a liquid crystal display panel that uses light emitted from the illuminating device as a backlight source.

In the above liquid crystal display device, the protrusion for fixing the optical guide plate of the illuminating device is formed on the side surface of the optical guide plate that crosses at right angles the light-incident end surface of the optical guide plate at a position outside the outgoing-angle range of the light emitted from the light source. Thus, occurrence of the bright line at the corner portion of the base of the protrusion can be prevented to thereby make the luminance in the luminescence section uniform. Therefore, uniform surface-emission light can be irradiated onto the liquid crystal panel, thereby preventing the display quality of the liquid crystal display device from being degraded.

Although the present invention has been described with reference to the preferred embodiments thereof, the illuminating device, liquid crystal display device, and portable terminal device according to the present invention are not limited only to the above embodiments, and an illuminating device, a liquid crystal display device, and a portable terminal device obtained by making various modifications or alterations in the configuration of the above-described embodiments will fall within the scope of the present invention.

This application is the National Phase of PCT/JP2007/064595, filed Jul. 25, 2007, which claims the benefit of priority from Japanese Patent Application No. 2006-205920, filed on Jul. 28, 2006, the entire disclosure of which is incorporated herein by reference.

The invention claimed is:

1. An illuminating device comprising:
   a light source that emits light spreading in a fan-shape; and
   an optical guide plate including a light-incident end surface that receives therein light emitted from said light source, a luminescence section that converts the received light into a surface-emission light for emission thereof, and a protrusion that fixes the optical guide plate onto a housing, wherein:
   said protrusion is formed on the side surface of the optical guide plate that crosses at right angles said light-incident end surface of said optical guide plate at a position outside an outgoing-angle range of the light that travels through said light-incident end surface while spreading in a fan-shape.

2. A liquid crystal display device comprising:
   the illuminating device according to claim 1; and
   a liquid crystal display panel that uses light emitted from the illuminating device as a backlight source.

3. A portable terminal device comprising the liquid crystal display device according to claim 2.

4. A liquid crystal display device comprising:
   a light source that emits light spreading in a fan-shape;
   an optical guide plate including a light-incident end surface that receives therein light emitted from said light source, a luminescence section that converts the received light into a surface-emission light for emission thereof, and a protrusion that fixes said optical guide plate onto a housing; and
   a liquid crystal display panel that uses light emitted from said luminescence section of said optical guide plate as a backlight source, wherein:
   said protrusion is formed on a side surface of said optical guide plate that crosses at right angles said light-incident end surface of said optical guide plate at a position outside an outgoing-angle range of the light that travels through said light-incident end surface while spreading in a fan-shape and that does not overlap an effective display area of said liquid crystal display panel.

5. A portable terminal device comprising the liquid crystal display device according to claim 4.

* * * * *